(12) United States Patent
Cochran et al.

(10) Patent No.: US 8,978,856 B2
(45) Date of Patent: Mar. 17, 2015

(54) OVER-TORQUE PROTECTOR DEVICE FOR A COMPRESSOR

(75) Inventors: Theodore R. Cochran, Amherst, NY (US); James A. Mogavero, Buffalo, NY (US); Timothy J. Skinner, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 493 days.

(21) Appl. No.: 13/467,087

(22) Filed: May 9, 2012

(65) Prior Publication Data

US 2012/0285784 A1    Nov. 15, 2012

Related U.S. Application Data

(60) Provisional application No. 61/484,351, filed on May 10, 2011.

(51) Int. Cl.
*F16D 43/20* (2006.01)

(52) U.S. Cl.
USPC ..................................................... 192/56.61

(58) Field of Classification Search
CPC ...... F16D 7/042–7/046; F16D 43/20–43/2026
See application file for complete search history.

(56) References Cited

U.S. PATENT DOCUMENTS

| | | | | |
|---|---|---|---|---|
| 2,643,530 A * | 6/1953 | Lathrop | ........................... | 464/39 |
| 3,379,034 A * | 4/1968 | Gustafson | ....................... | 464/38 |
| 3,981,382 A * | 9/1976 | Bolliger | ......................... | 192/150 |
| 4,243,128 A | 1/1981 | Shirai | | |
| 5,642,798 A | 7/1997 | Muirhead et al. | | |
| 6,234,904 B1 * | 5/2001 | Kawaguchi et al. | ............ | 464/30 |
| 6,471,024 B2 | 10/2002 | Ota et al. | | |
| 7,037,201 B2 * | 5/2006 | McCoy et al. | .................. | 464/37 |
| 7,040,470 B2 | 5/2006 | Dion | | |
| 2002/0162720 A1 * | 11/2002 | Kimura et al. | ............... | 192/55.1 |
| 2012/0277006 A1 * | 11/2012 | Kim | .................. | 464/37 |
| 2014/0113732 A1 * | 4/2014 | Ichinose | ........................ | 464/38 |

FOREIGN PATENT DOCUMENTS

| | | | | |
|---|---|---|---|---|
| JP | 2003035321 A | * | 2/2003 | |
| JP | 2003148510 A | * | 5/2003 | |

* cited by examiner

*Primary Examiner* — Robert A Siconolfi
*Assistant Examiner* — Huan Le
(74) *Attorney, Agent, or Firm* — James M. Chan

(57) ABSTRACT

An over-torque protector device including a drive pulley and a drive hub. A plurality of receptacles extends from a pulley face, and a plurality of links extends from a drive hub plate. Each link has a first end pivotably engaged to the plate and a second end provided with coupling means for releasably coupling the drive hub and the drive pulley for unified rotation through operative engagement with the receptacles in a device engaged state, the coupling means and the receptacles out of operative engagement in a device released state. The coupling means and the receptacles have relative axial movements induced by relative rotation between the drive pulley and the drive hub. Transition from the device engaged state to the device released state is induced by the relative axial movements of the coupling means and the receptacles.

20 Claims, 4 Drawing Sheets

OVER-TORQUE PROTECTOR DEVICE FOR A COMPRESSOR

CROSS-REFERENCE TO RELATED APPLICATION(S)

This application claims the benefit under Title 35, U.S.C. §119(e) of U.S. Provisional Patent Application Ser. No. 61/484,351, entitled IMPROVED OVER TORQUE PROTECTOR FOR COMPRESSORS, filed on May 10, 2011, the entire disclosure of which is incorporated herein by reference.

BACKGROUND OF THE INVENTION

The present disclosure relates to a compressor; more specifically, to an over-torque protector device for a compressor.

Clutchless compressors require the ability to stop transmitting torque between the powertrain and the compressor if the compressor seizes. This is accomplished by a device called an over-torque protector (OTP). In the event of compressor seizure, an OTP allows the compressor drive pulley driven by the powertrain system to continue rotating unencumbered by the compressor's drive shaft, which can no longer rotate.

In today's clutchless compressor applications there are two different basic types of OTP designs for releasing the compressor drive shaft from the powertrain system: Those including a fracture element, and those including a mechanical release.

The fracture element concept relies on the premise of actually fracturing or breaking of a part to discontinue torque transmission from the powertrain to the compressor drive shaft. The mechanical release concept relies on the premise of discontinuing torque transmission from the powertrain to the compressor drive shaft by various methods that do not fracture or break intermediate parts, but rather involve releasing or uncoupling mechanically connected parts and typically include mechanisms having, for example, springs, cams, hooks, ratchets and/or gears.

OTPs according to fracture element concepts obviously require the replacement of the fractured or broken parts, and may result in undesirable debris being produced. Further, fracture element type OTPs are often plagued by unpredictable release points and poor fatigue durability. Often, OTPs according to prior mechanical release concepts also suffer from poor fatigue durability. Further, their designs tend to be complex, and may be complicated to manufacture, difficult to assemble, and/or expensive to implement. An OTP for a compressor that overcomes such shortcomings would represent a desirable improvement in the relevant art.

SUMMARY OF THE INVENTION

The present invention provides such an improvement in an OTP of the mechanical release type. The inventive OTP provides at least four advantages over prior OTPs of one or both types: a predictable release point; improved fatigue durability; amenability to lean manufacture processes; and low cost and complexity.

An object of an OTP according to the present invention is to facilitate reduced variation in release torque. This accomplished by its drive hub link and pulley assembly receptacle couplings being designed to release at a specific load and within a tight range of torque.

Another object of an OTP according to the present invention is to improve fatigue durability. This is accomplished by employing a link shape that is comparatively simple relative to prior mechanical release OTP designs.

Another object of an OTP according to the present invention is to facilitate lean manufacturing processes. This is accomplished by employing a simple design having few parts, and which can be readily adapted to conventional compressors and engine front end accessory drive (FEAD) systems.

Another object of an OTP according to the present invention is to provide a lower-cost alternative to many prior OTP designs. This is accomplished by the inventive OTP having very few parts, and being amenable to a lean manufacturing process requiring very few assembly steps and utilizing common components, thereby mitigating costs.

The present invention provides an OTP device for a compressor having a drive shaft. The device has engaged and released states, and includes a drive pulley having a plurality of receptacles extending from a pulley face. A drive hub adapted for rotatably fixed engagement with the drive shaft includes a plate spaced from the pulley face and defines an opening for receiving the drive shaft. A plurality of links extends from the plate, each link having a first end pivotably engaged to the plate and a second end provided with coupling means for releasably coupling the drive hub and the drive pulley for unified rotation about the axis through operative engagement with the receptacles in the device engaged state. The coupling means and the receptacles are out of operative engagement, and the drive hub and drive pulley are uncoupled in the device released state. Relative rotation between the drive pulley and the drive hub about the axis is imparted by driven rotation of the drive pulley and arrested rotation of the drive hub. The coupling means and the receptacles have relative axial movements in directions substantially parallel with the axis induced by the imparted relative rotation between the drive pulley and the drive hub. Transition from the device engaged state to the device released state is induced by the relative axial movements of the coupling means and the receptacles, whereby the drive pulley is continually rotatable about the axis relative to and unencumbered by the drive hub in the device released state.

BRIEF DESCRIPTION OF THE DRAWINGS

The above-mentioned and other features and objects of the invention, and the manner of attaining them, will become more apparent, and the invention itself will be better understood, by reference to the following description of an exemplary embodiment of the invention representing its best mode, taken in conjunction with the accompanying drawings, wherein.

Figure 1:
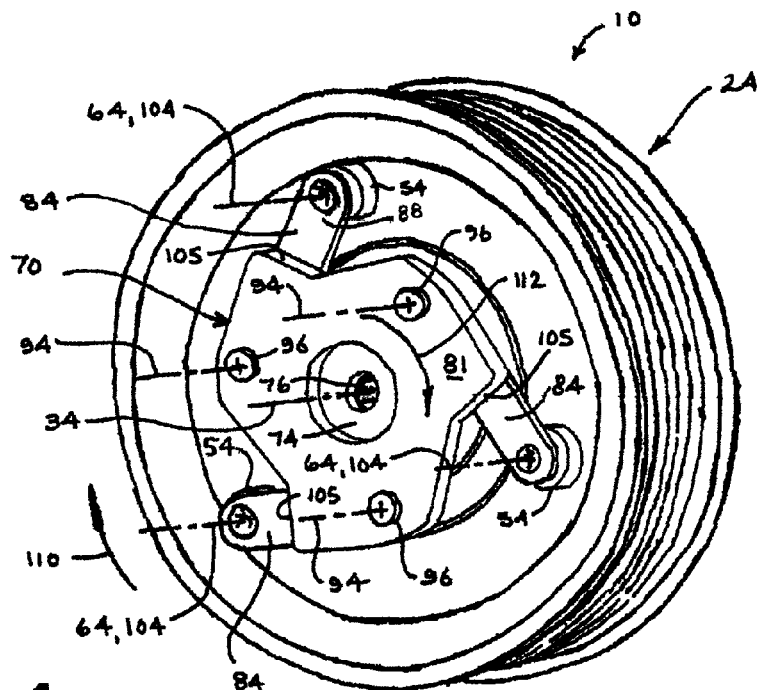
FIG. 1 is a front perspective view of an exemplary embodiment of the OTP incorporated into a pulley and drive hub assembly for a compressor.

Corresponding reference characters indicated corresponding parts throughout the several views. Although the drawings represent an embodiment of the present invention, the drawing are not necessarily to scale or to the same scale and certain features may be exaggerated in order to better illustrate and explain the present invention.

DETAILED DESCRIPTION OF THE EXEMPLARY EMBODIMENT(S) OF THE INVENTION

In accordance with a preferred embodiment of the invention, the Figures show an OTP 10 of the mechanical release type incorporated into a pulley and drive hub assembly for use with a clutchless automotive air conditioning system compressor. The compressor may be of any rotatable shaft-driven type, and may be mounted, as is typical, to an automobile engine directly or through brackets. The compressor is driven by the engine powertrain through the engine's FEAD system, typically through a drive belt (not shown) that continually engages the compressor's pulley and rotates the pulley during engine operation.

Referring to the drawings, the compressor assembly 20 includes a compressor 22, and a drive pulley assembly 24 which, as mentioned above, is continually engaged with and driven by the engine powertrain and mounted to the front of the compressor 22. The annular pulley assembly 24 has a central opening in which is located a bearing assembly 26 (schematically shown in the drawings) through which the pulley assembly 24 is rotatably mounted to the forwardly-extending cylindrical nose 28 of the compressor housing 30. A compression mechanism (not shown) of any type suitable for such an application is located in the housing 30. The compression mechanism is operably coupled to a rotatable drive shaft 32 having an axis of rotation 34 that is concentric with the housing nose 28 and the pulley assembly 24. Axial and radial directions mentioned herein are relative to the drive shaft axis of rotation 34. The terms "inner" and "outer" used herein generally refer to axial directions toward and away from the compressor housing 30 along the axis 34, respectively, or radial directions toward and away from the axis 34, respectively. The terms "rearward" and "forward" used herein generally refer to axial directions relative to the compressor 22 and along the axis 34.

The compressor housing 30 is provided with an external shoulder 36 surrounding and extending radially outward of the base of the nose 28; the rearward axial end of the inner race (not shown) of the bearing assembly 26 abuts the shoulder 36. The forward axial end of the inner race of the bearing assembly 26 is retained onto the nose 28 by a snap ring 38 received in a cooperating groove near the forward axial end of the nose 28. The pulley assembly 24 includes a rigid pulley body 40 provided with an axially extending cylindrical collar 42 provided with an internal shoulder 44 extending radially inward therefrom. The forward axial end of the outer race (not shown) of the bearing assembly 26 abuts the shoulder 44. The rearward axial end of the cylindrical collar 42 is staked at circumferentially distributed locations 46 to engage the rearward axial end of the outer race of the bearing assembly 26. The pulley assembly 24 is thus retained in an axially fixed location relative to the compressor housing 30, with the pulley body 40 rotatable relative to the housing 30 and the drive shaft 32.

The pulley body 40 has a flange 48 that extends radially outwardly from the forward axial end of the collar 42. The flange 48 is substantially circular and planar. The pulley body 40 has a substantially cylindrical pulley sheave 50 affixed to the outer periphery of the flange 48. The sheave 50 is concentric with the axis 34, and its outer circumferential surface defines a series of grooves that engage a FEAD belt (not shown) for driving the pulley assembly 24 in a manner well known in the art.

Figure 2:
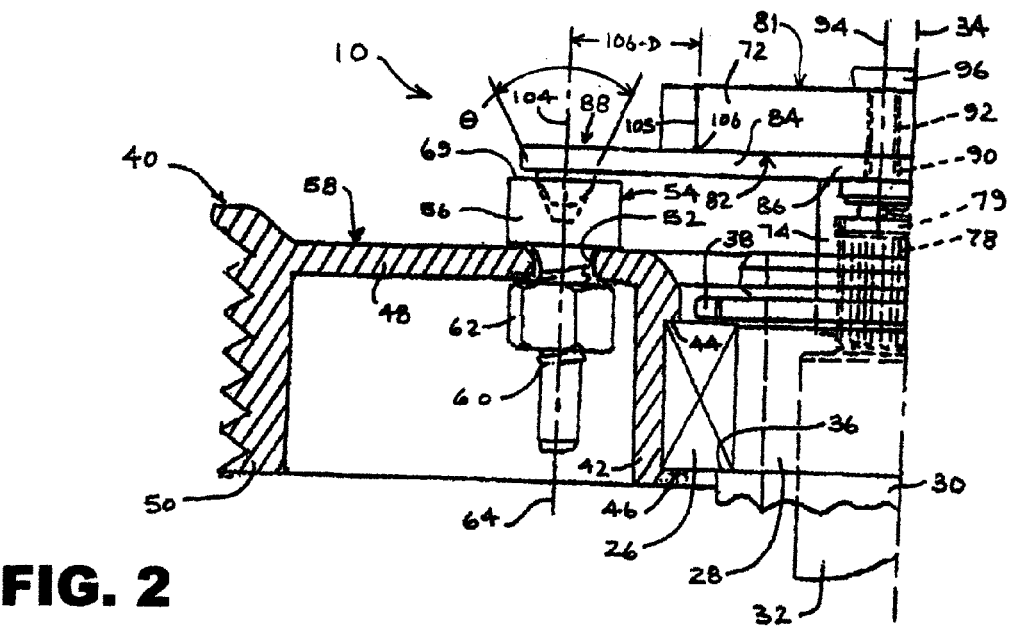
FIG. 2 is a partially cross-sectioned, fragmented view of a compressor assembly employing the exemplary OTP embodiment.

The planar flange 48 has a thickness that is smaller than the axial length of the collar 42, and is provided with a plurality of circumferentially distributed apertures 52 extending through its thickness, as perhaps best seen in FIG. 2. The apertures 52 are commonly located at radius $R_A$ from the central axis 34 and are equally distributed circumferentially. As shown in the Figures, three apertures 52 are provided, circumferentially spaced 120° apart.

The drive pulley assembly 24 includes a plurality of identical receptacles 54 that are fitted into the apertures 52. Each receptacle 54 has a head 56 that projects axially from the outer axial face 58 of the pulley body flange 48, and an elongate, threaded body 60 that is fitted into its respective aperture 52. Apertures 52 may be tapped to threadedly receive the receptacle bodies 60. Alternatively, as shown, the apertures 52 may be clearance holes through which the elongate receptacle bodies 60 extend, with each body 60 threadedly engaged with a nut 62, thereby affixing the receptacles 54 to the pulley body flange 48. Thus, the mated pairs of apertures 52 and receptacles 54 are each positioned with their respective central axes 64 all located at radius $R_A$. The axes 64 are parallel with the drive shaft rotation axis 34, and rotate with the pulley assembly 24 about the compressor housing nose 28 along a circular path 66 located about axis 34 at radius $R_A$ and which is followed by the receptacles 54 during pulley rotation.

Each receptacle head 56 is provided with a pocket or recess 68 that extends inwardly of a flat, outer axial surface 69 defined on the receptacle head 56. The surface 69 is substantially perpendicular to the receptacle axis 64. The side wall surfaces of the recesses 68 diverge from their receptacle axes 64 as they approach their respective outer axial surfaces 69. Each recess 68 is preferably symmetrical about its receptacle axis 64, and may be conical, frustoconical, or generally hemispherical, as perhaps best illustrated in FIGS. 3 and 5. At diametrically opposed locations, the side wall surface(s) of each recess 68 are preferably oriented relative to each other such that the included angle $\theta$ therebetween is in a range that is greater than about 30° and less than about 90°. The outer circumferential surface of the receptacle head 56 may be substantially cylindrical as shown, or configured to accept a tool (e.g., a wrench or socket) to facilitate securing the receptacle 54 to the pulley body 40. Preferably, the recess 68 in the axial surface 69 of each receptacle head 56 is substantially smooth and featureless as shown, but alternatively may be configured to accept a tool (e.g., an Allen wrench or Torx bit) to facilitate securing the receptacle 54 to the pulley body 40.

The compressor assembly 20 further includes a drive hub assembly 70 through which the pulley assembly 24 and the drive shaft 32 are operably coupled. Torque-transmitting engagement between the drive hub assembly 70 and the pulley assembly 24 is discontinued in the event of an over-torque condition, whereby the drive shaft 32 is rotatably disconnected from the pulley assembly 24.

The drive hub assembly 70 includes a rigid, planar hub plate 72 having an affixed, centrally located cylindrical hub member 74 that is concentric with the drive shaft rotation axis 34. The hub member 74 extends axially rearward of the hub plate 72 into the nose 28 of the compressor housing 30 and defines an opening into which is received the forward end of the drive shaft 32. The defined opening of the hub member 74 has internal splines 76 that cooperatively engage external splines 78 provided on the forward end of the drive shaft 32. The drive hub assembly 70 is thus adapted for rotatably fixed engagement with the drive shaft 32. The desired axial location of the hub plate 72 relative to the pulley body face 58 is set through the use of one or more flat, annular spacers 79 of variously selected thicknesses disposed against an annular, rearwardly-facing internal shoulder (not shown) within the cylindrical hub member 74. The threaded body of a bolt 80 having a shouldered head that engages the hub plate axially outer face 81 is inserted into the hub member 74 and through the annular spacer(s) 79. The bolt body extends along the axis 34 and is threaded received into an axial, threaded bore in the drive shaft 32, thereby axially securing the drive hub assembly 70 to the drive shaft 32. With the bolt 80 tightened, the rearward axial end of the annular spacer(s) 79 abuts the forward axial end of the drive shaft 32, in a manner well-known in the art for setting air gaps between the frictionally engaging surfaces clutch hubs and pulleys in compressor clutches used in clutched compressor assemblies. Thus, the inner axial face 82 of the hub plate 72 is spaced at a selected axial distance from the interfacing, outer axial face 58 of the pulley assembly flange 48 and the outer axial surfaces 69 of the receptacle heads 56 in which the recesses 68 are located. The interfacing outer and inner axial faces 58 and 82 of the pulley flange 48 and the hub plate 72, respectively, are generally parallel to each other and perpendicular to the drive shaft axis of rotation 34.

Figure 8:
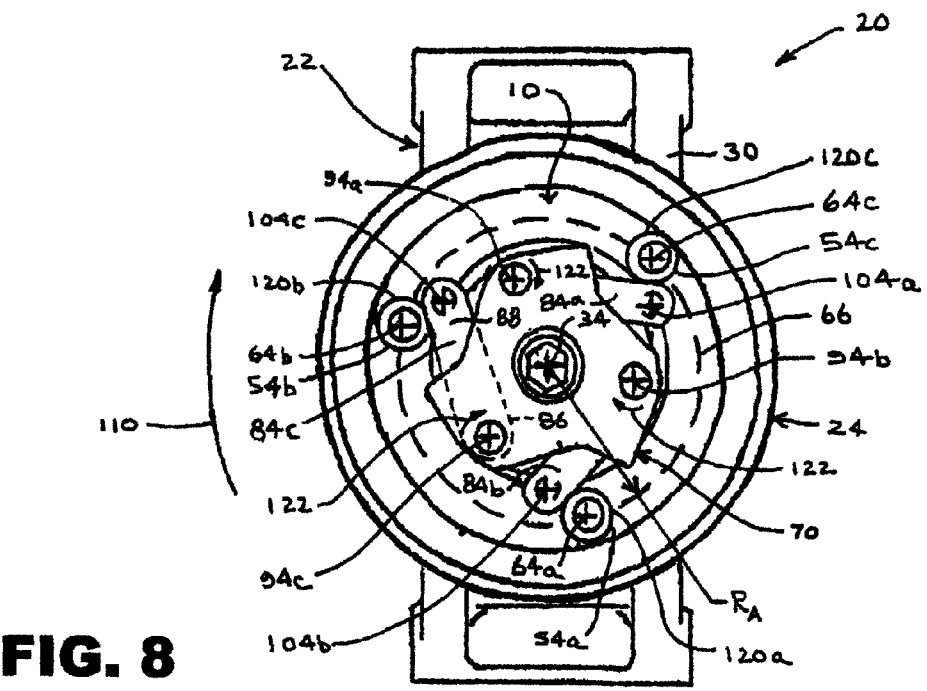
FIG. 8 is similar to FIG. 7, but depicts the compressor assembly immediately after it has seized and the OTP has uncoupled the pulley assembly and the drive hub assembly, with the pulley assembly shown rotated clockwise relative to its position shown in FIG. 7.

The drive hub assembly 70 includes a plurality of identical, elongate, planar, substantially rigid links 84. The links 84 may, for example, be low-carbon steel stampings of uniform thickness between their opposing planar sides, and though characterized as being substantially rigid, may be elastically deflected under the influence of a sufficient bending moment and therefore may be considered leaf springs. The straight, stamped, planar links are designed to improve the fatigue durability of the OTP 10. The number of the links 84 is matched to the number of the receptacles 54; thus, three links 84 are included. Each link 84 has a first, radially inner end 86 and an opposite second, radially outer end 88. The opposite ends 86, 88 of the links 84 may both have edges semicircular in shape, as shown in FIG. 8.

Figure 3:
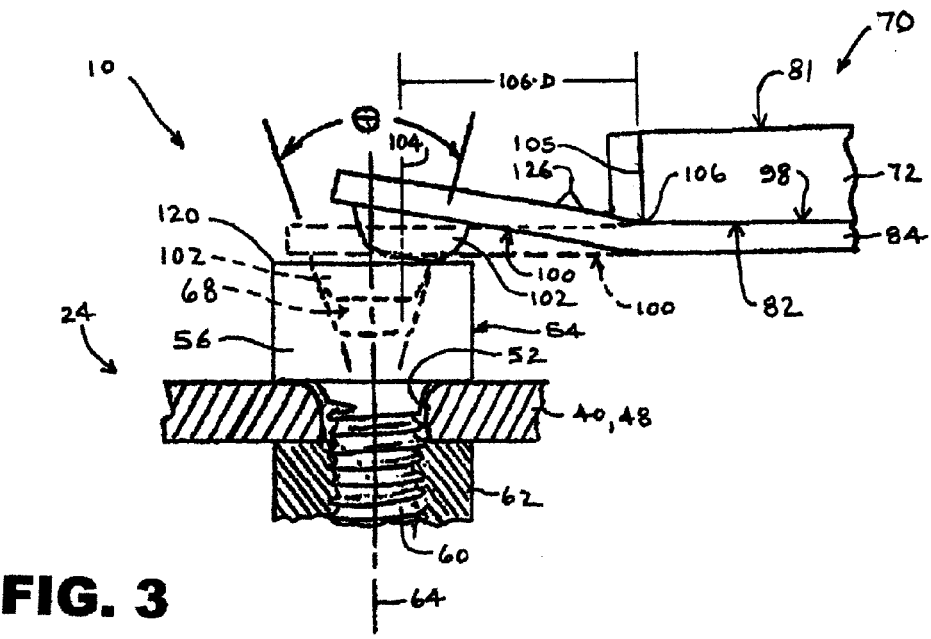
FIG. 3 is an enlarged, partial view similar to that of FIG. 2, showing a drive hub link and pulley assembly receptacle, shown coupled in phantom lines and during movement relative to each other as they become uncoupled in solid lines.
Figure 7:
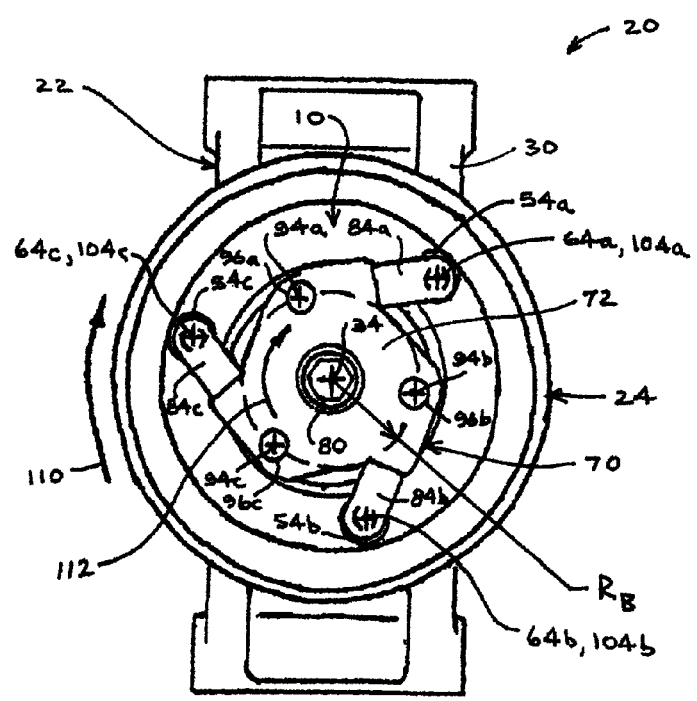
FIG. 7 is a front axial view of a compressor assembly in which it is externally driven by the powertrain (not shown), the pulley assembly and drive hub assembly of an OTP being coupled for their rotation in unison with the compressor drive shaft.
Figure 4:
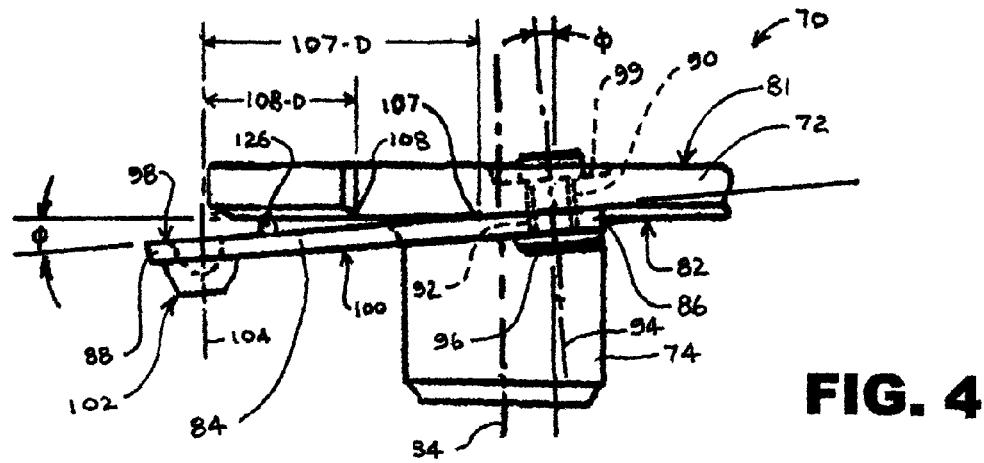
FIG. 4 is a fragmented view of a drive hub assembly of an alternative OTP embodiment.

The hub plate 72 is provided with a plurality of circumferentially distributed apertures 90 extending through its thickness, as best seen in FIGS. 2 and 4. The apertures 90 are commonly located at radius $R_B$ from the central axis 34 and are equally distributed circumferentially. As shown, three apertures 90 are provided, circumferentially spaced 120° apart. The first, inner end 86 of each planar link 84 is provided with an aperture 92 extending through the link's thickness. The apertures 90 and 92 are circular and preferably of a common diameter. A pair of apertures 90 and 92 is aligned along one of three pivot axes 94, and a fastener 96 is inserted through the aligned apertures 90, 92 which, as shown, may be clearance holes. The pivot axes 94 are located at radius $R_B$ from the drive shaft rotation axis 34 and rotate with the drive hub assembly 70 thereabout during compressor operation, as shown in FIG. 7. In the OTP embodiment depicted in FIGS. 1-3, the pivot axes 94 are parallel with the drive shaft rotation axis 34. In the alternative OTP embodiment depicted in FIGS. 4-6, the pivot axes 94 are slightly offset from axis 34 by angle as shown in FIG. 4, with planar surface portions 97 provided on hub plate axially inner face 82 that are normal to their respective offset pivot axes 94. Angle may, for example, be in a range from about 1° to about 5°.

The fastener 96, which may be a rivet as shown or bolt and nut assembly, extends through the stacked thicknesses of both the hub plate 72 and the link 84, securing them in axially-abutting engagement but permitting their relative rotation about the respective pivot axis 94. In the OTP embodiment shown in FIGS. 1-3, the axially outer face 81 of the hub plate 72 may be planar and generally parallel with its axially inner face 82. In the alternative OTP embodiment shown in FIGS. 4-6, the hub plate axially outer face 81 may be locally provided with a planar pad 99 about each aperture 90, each pad 99 parallel to the respective, axially opposite planar surface portion 97 of the hub plate axially inner face 82.

Alternatively, the hub plate apertures 90 may be tapped, and the fastener 96 may be a screw that is inserted from the axially inner side of the link 84 through its clearance aperture 92 and is threadedly received in the tapped aperture 90, with the head of the fastener 96 holding the link 84 in axially-abutting engagement against the inner axial face 82 of the hub plate 72. Preferably, the attachment of each link 84 to the hub plate 72 is such that their relative rotation about the respective pivot axis 94 is facilitated while maintaining abutting engagement between the hub plate axially inner surface 82 and the axially outer side surface 98 of the planar link 84.

At the second, outer end 88 of each planar link 84, its axially inner side 100 is provided with a generally frustoconical or hemispherical projection 102 that may be stamped through the thickness of the link 84. Relative to each link 84, the projection 102 is generally located along a coupling means axis 104 that is parallel with axis 94.

Figure 5:
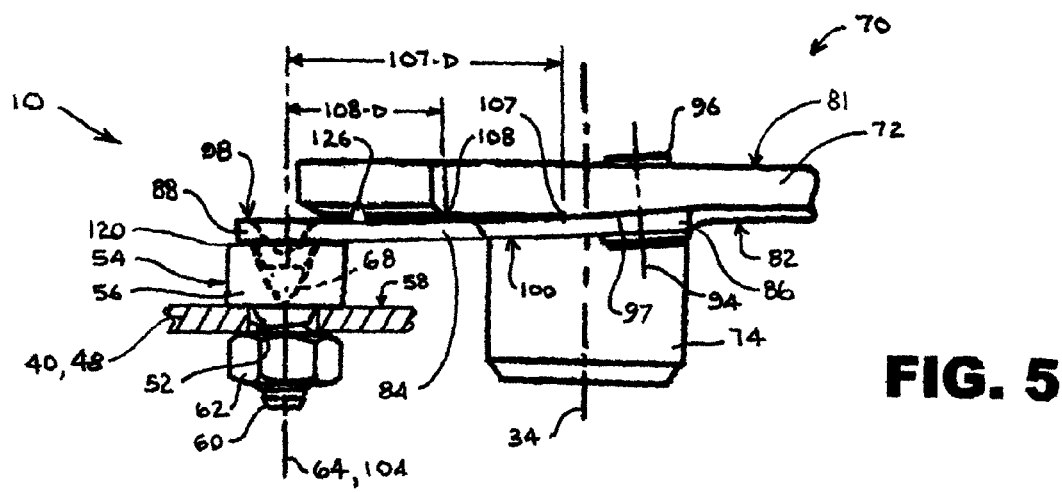
FIG. 5 is a fragmented view of the drive hub assembly of FIG. 4 and a fragmented partial, cross-sectioned view of the pulley assembly of the alternative OTP embodiment shown coupled.

The projections 102 are received into the respective recesses 68 during assembly of the drive hub assembly 70 to the compressor 22, thereby coaxially aligning the respective axes 64 and 104 relative to each receptacle 54, as shown in FIGS. 2 and 5. In other words, in the engaged state of the OTP 10 a respective pair of axes 64, 104 substantially coincide. The projections 102 define means for releasably coupling the pulley assembly 24 and the drive hub assembly 70 for unified rotation through engagement with the receptacles 54. As shown, the coupling means includes projections 102 that are operably engaged with the receptacle recesses 68 in the OTP engaged state. Those of ordinary skill in the art will however recognize that, alternatively, the OTP 10 may instead be reversely configured such that the outer axial face 69 of each receptacle 54 is provided with a coupling means or projection 102 which, in the OTP engaged state, projects into and is operably engaged with a recess 68 defined in the axially inner side 100 of a link 84 at its second end 88.

When the OTP 10 is engaged, the compressor drive shaft 32 is driven during pulley rotation by the contacting engagement between the coupling means 102 and the recesses 68. This engagement is maintained under normal compressor operating conditions by each of the projections 102 and its respective recess 68 being axially forced into a mutually seated position during tightening of the bolt 80 during assembly of the drive hub assembly 70 to the drive shaft 32. The tightening of the bolt 80 exerts a prescribed, operational bending moment in the link 84 once the bolt 80 is tightened, compressing the annular spacer(s) 79 and establishing the position of drive hub assembly 70 along the axis 34.

In the OTP embodiment shown in FIGS. 1-3, the forces applied to each link 84 include an axially rearward force applied along its adjacent edge 105 of the hub plate 72. Each edge 105 extends across the width of its respective link 84 substantially perpendicularly to the length of the link between its axes 94 and 104, and defines a fulcrum 106 against which the link axially outer side 98 is supported and along which the axially rearward force is applied to the link 84. That axially rearward force is opposed by axially forward forces applied to each link 84 substantially at the locations of their axes 94 and 104 by the respective fastener 96 and receptacle 54. It can thus be understood that in the OTP embodiment shown in FIGS. 1-3, when the bolt 80 is tightened, thereby compressing the spacer(s) 79, the axial distance between the axially outer surfaces 69 of the receptacle heads 56 and the planar, axially inner face 82 of the hub plate 72 is somewhat less than the thickness of the links 84; i.e., the links 84 are elastically deflected slightly out of their natural, substantially planar configuration.

The effective leaf spring length of each link 84 is influenced by the distance between the location of the fulcrum 106 and the projection 102. Relative to each link 84 oriented about its pivot axis 94 in a position for OTP engagement, the fulcrum 106 is located at a distance 106-D along the link length from its projection 102, the location of which is indicated by its axis 104. In this embodiment, in which the drive hub axially inner face 82 is planar and is maintained in surface-to-surface contact with the link axially outer side 98, for a given link 84 and thickness of spacer(s) 79, the spring load that allows OTP release can be increased by selecting a shorter distance 106-D, or decreased by selecting a longer distance 106-D.

Figure 6:
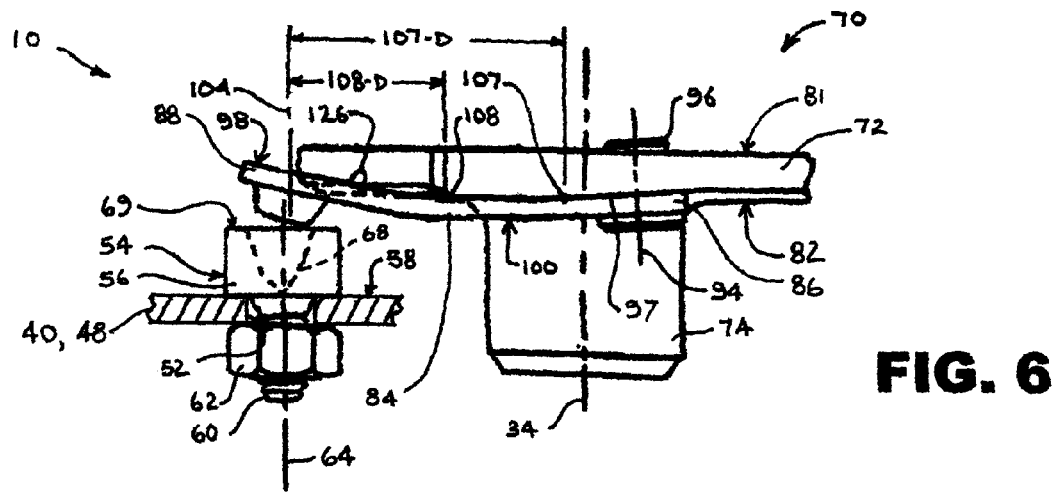
FIG. 6 is a view similar to FIG. 5, showing the drive hub assembly and pulley assembly during movement relative to each other as they become uncoupled.

In the alternative OTP embodiment shown in FIGS. 4-6, the hub plate axially inner faced 82 provides a pair of parallel first and second fulcrums 107 and 108 for each link 84, by which the effective leaf spring length of the link 84 is influenced. Relative to each link 84 oriented about its pivot axis 94 in a position for OTP engagement, the first and second fulcrums 107 and 108 are respectively located at first and second distances 107-D and 108-D along the link length from its projection 102 (the location of which is indicated by its axis 104), and extends across the width of the link 84 substantially perpendicularly to the length of the link between its axes 94 and 104. The planar surface portion 97, against which abuts a link axially outer side 98, is defined by a respective first fulcrum 107. Between each pair of parallel first and second fulcrums 107 and 108, the hub plate axially inner face 82 is planar and substantially perpendicular to the drive hub central axis 34.

Relative to normal compressor operating conditions, an increased torque load on the drive shaft 32 can move a projection 102 slightly out of its fully seated engagement with its respective recess 68, further deflecting the link 84 slightly. Such increased, but not excessive, torque loads may, for example, result from a minor degree of slugging whereby the compressor attempts to compress liquid refrigerant in the compression chamber, or under certain compressor startup conditions. The OTP 10 can accommodate such torque increases without releasing if the projections 102 do not disengage their respective recesses 68. In the alternative OTP embodiment of FIGS. 4-6, this accommodation is first facilitated by the first fulcrums 107 supporting their link axially outer sides 98 and applying axially rearward forces on the links 84 at the first distances 107-D from the projections 102. The relatively longer effective leaf spring length afforded by the first fulcrums 107 establishes a first, relatively lower spring rate at which nonexcessive torque increases can be accommodated by the OTP 10, which remains engaged. In the event of more significant torque increases, the resulting greater further deflection of each link 84 places the link axially outer side 98 in contact with its respective second fulcrum 108, which may be defined by a hub plate edge 105 and is therefore closer than the first fulcrum 107 is to the projection 102; in other words distance 107-D is greater than distance 108-D. The link axially outer side 98 being supported by the second fulcrum 108 shortens the effective leaf spring length and establishes a second, relatively higher spring rate under which the OTP 10 may release depending on the experienced torque load and consequent link deflection. In a compressor including the alternative OTP embodiment shown in FIGS. 4-6, it is only when operating under the second, relatively higher spring rate that the OTP 10 will disengage or release.

Thus, according to either of the above-described OTP embodiments, in the OTP engaged state the links 84 are under an operational bending moment prescribed within a desired range selected that establishes the torque-carrying capacity of the OTP 10. Torque transmission between the pulley assembly 24 and the drive hub assembly 70 is discontinued when the torque-carrying capacity of the OTP is exceeded, and the projections 102 and the recesses 68 become disengaged, as shown in solid lines in FIG. 3, and in FIG. 6. The OTP 10 is thus of a mechanical release type. The torque-carrying capacities of various different OTP device designs according to the present invention may vary, but a particular design having a specifically selected set of OTP component parameters is expected to have a consistent, predictable torque-carrying capacity.

Figure 9:
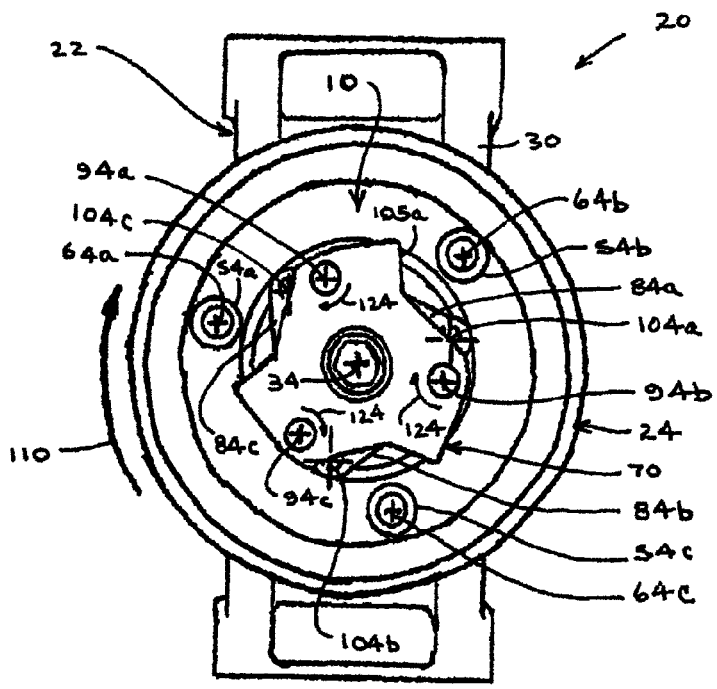
FIG. 9 is similar to FIG. 8, but depicts the compressor assembly at a later time after it has seized and the OTP has uncoupled the pulley assembly and the drive hub assembly, with the pulley assembly shown rotated further clockwise relative to its position shown in FIG. 8.

The operation of an OTP 10 according to either of the above-described embodiments is sequentially shown in FIGS. 7-9, wherein elements associated with each of the three sets of receptacles 54 and engaged links 84, and their axes 64, 94, and 104, are respectively identified with a suffix a, b, or c.

When the projections 102 and recesses 68 are engaged, the circumferential, inner surface(s) of each recess 68 extending about its axis 64, and the interfacing circumferential, outer surface of its respective projection 102 extending about its coupling means axis 104, are abuttingly engaged. Thus, as the pulley assembly 24 is continually driven about its central axis 34, the receptacles 54 impart movement to the links 84, and therefore to the hub plate 72 and the drive shaft 32.

The OTP 10 has an engaged state in which the projections 102 and the receptacles 54 are operably engaged. In the engaged state of the OTP 10, the projections 102 are each seated within their respective recesses 68, as shown in FIGS. 2 and 5, and in phantom lines in FIG. 3. Referring to FIG. 7, the clockwise arrows 110 and 112 respectively indicate the rotations of the pulley assembly 24 and the drive hub assembly 70 about the drive shaft rotation axis 34. In the OTP engaged state, the pulley assembly 24 and the drive hub assembly 70 rotate in unison during compressor operation, with the pulley assembly 24 pulling the drive hub assembly 70 about the axis 34, thereby placing the links 84 in tension between their respective axes 94 and 104.

In the event that rotation of the drive shaft 32 relative to the housing 30 is arrested, whereby the drive shaft 32 becomes either rotatably fixed or requires excessive rotational torque, the OTP 10 transitions from its engaged state to a released state, i.e., it mechanically disengages. In the device released state, the drive hub assembly 70 and the pulley assembly 24 are rotatably uncoupled, thereby permitting relative rotation therebetween. Arrested rotation of the drive shaft 32 may occur, for example, as a result of seizure or other failure within the compressor 22 that substantially increases the torque required to rotate the drive shaft 32, or as a result of excessive slugging which can lead to component failures within the compressor. Once the OTP 10 disengages, the pulley assembly 24 will continue to rotate, as indicated by arrow 110, whereas the drive hub assembly 70 and the drive shaft 32 will cease to rotate, and no driving torque will be applied thereto, as shown in FIG. 8.

Disengagement of the OTP 10 is perhaps best shown in FIGS. 3 and 6, and results from the torque required to rotate the drive shaft 32 being greater than which can be transmitted through the engagement between the recesses 68 and the projections 102. Excessive torque between the pulley assembly 24 and the drive hub assembly 70 results in sliding movement between the contacting surfaces of the projections 102 and the recesses 68, an increasing of the bending moment in each link 84 above its prescribed, operating level, and the projections 102 being moved out of engagement with the recesses 68. During uncoupling of the rotating pulley assembly 24 and the nonrotating drive hub assembly 70, the links 84 deflect out of their normal operating configurations under an axially directed force components imparted by the sliding movements of the projections 102 along the angled walls of the recesses 68, inducing the increased bending moment. Once the forward, outer circumferential edges 120 that define the outer peripheries of the receptacle head outer axial surfaces 69 move past their respective projections 102, the links 84 may elastically return substantially to their natural, undeflected configurations, though they may be rotated slightly clockwise, as viewed in FIG. 8, about their respective pivot axes 94, as indicated by arrows 122.

However, as shown in FIG. 8, immediately after the OTP 10 enters its released state, the second, outer ends 88 of the links 84, which are no longer rotating about the drive shaft axis 34, are initially still in and obstructing the circular path 66 followed by the rotating receptacles 54. A second receptacle 54 that follows a first receptacle 54 just released from its respective (first) link 84, along the circular path 66, impacts the (first) link 84 and drives it further about its (first) pivot axis 94 and behind the inner axial face 82 of the hub plate 72, as indicated by clockwise arrows 124, thereby clearing the circular path 66 followed by the receptacles 54, and preventing further contact between the receptacles 54 and the links 84.

By way of example, with continued reference to FIG. 8, the circumferential edge 120 of receptacle 54a impacts link 84b, the circumferential edge 120 of receptacle 54b impacts link 84c, and the circumferential edge 120 of receptacle 54c impacts link 84a. These impacts drive the links 84a-c further about their respective pivot axes 94a-c and into their fully retracted positions behind the hub plate 72, as shown in FIG. 9, wherein further contact between the links 84 and the receptacles 54 does not occur.

The links 84 are preferably held in their fully retracted positions shown in FIG. 9 by the frictional engagement between their axially outer side surfaces 98 and the inner axial face 82 of the hub plate 72. Alternatively, the axially outer side surface 98 of each of the links 84 may be optionally provided with a small retention projection 126 (FIGS. 3 and 4) that is forced behind and frictionally engages the inner axial face 82 of the hub plate 72, to assist in holding the links 84 in their fully retracted positions (FIG. 9) and out of the circular path 66 along which the receptacles 54 move. Thus, once the OTP 10 has been released, the pulley assembly 24 can continue to rotate about the axis 34 completely disengaged from, and without further contact with, the drive hub assembly 70.

While this invention has been described in terms of a preferred, exemplary embodiment thereof, it may be further modified within the spirit and scope of its disclosure to the extent set forth in the claims that follow. This application is therefore intended to cover any variations, uses, or adaptations of the invention using its general principles. Further, this application is intended to cover such departures from the present disclosure as come within know or customary practice in the art to which this invention pertains.

What is claimed is:

1. An over-torque protector device for a compressor having a drive shaft, said device having engaged and released states and comprising:
    a drive pulley defining a substantially central opening about a central axis and a face, said drive pulley comprising a plurality of receptacles extending from said face; and
    a drive hub comprising:
        a plate spaced from said drive pulley face and defining an opening for receiving the drive shaft, said drive hub being adapted for rotatably fixed engagement with the drive shaft, and
        a plurality of links extending from said plate, each said link having a first end pivotably engaged to said plate and a second end provided with coupling means for releasably coupling said drive hub and said drive pulley for unified rotation about said central axis through operative engagement with said receptacles in said device engaged state, said coupling means being out of operative engagement with said receptacles, and said drive hub being uncoupled from said drive pulley, in said device released state;
    wherein relative rotation between said drive pulley and said drive hub about said central axis is imparted by driven rotation of said drive pulley and arrested rotation of said drive hub, said coupling means and said receptacles having relative axial movements in directions substantially parallel with said central axis induced by said imparted relative rotation between said drive pulley and said drive hub, the transition from said device engaged state to said device released state induced by said relative axial movements of said coupling means and said receptacles, whereby said drive pulley is continually rotatable about said central axis relative to and unencumbered by said drive hub in said device released state.

2. The over-torque protector device of claim 1, wherein said drive pulley has a plurality of apertures into which said plurality of receptacles is fitted.

3. In combination with a compressor having a drive shaft, the over-torque protector device of claim 1.

4. The over-torque protector device of claim 1, wherein said plurality of receptacles is distributed about said central axis at a first radial distance from said central axis.

5. The over-torque protector device of claim 4, wherein said plate and said link first ends are pivotably engaged along pivot axes, said pivot axes distributed about said central axis at a second radial distance from said central axis, said first radial distance greater than said second radial distance.

6. The over-torque protector device of claim 1, wherein each said coupling means is located along a respective coupling means axis, said coupling means axes substantially parallel with and distributed about said central axis, said coupling means axes radially closer to said central axis in said device released state than in said device engaged state.

7. The over-torque protector device of claim 6, wherein each said receptacle has a receptacle axis substantially parallel with said central axis, and in said device engaged state a respective pair of said receptacle and coupling means axes substantially coincide.

8. The over-torque protector device of claim 1, wherein each of one of said coupling means and said receptacles is provided with a projection and each of the other of said coupling means and said receptacles is provided with a recess in which a said projection is engaged in said device engaged state, each said recess and each said projection having a respective axis moveable relative to said central axis.

9. The over-torque protector device of claim 8, wherein each said link first end is pivotably engaged to said plate about a pivot axis, a respective pair of said recess and projection axes moveable in unison about said central axis in said device engaged state, one of said pair of recess and projection axes moveable about said central axis in said device released state, the other of said pair of recess and projection axes moveable about its respective said pivot axis in said device released state.

10. The over-torque protector device of claim 1, wherein said coupling means comprises a projection extending from each said link, and said receptacles each have a recess with which a said projection is engaged in said device engaged state, said projections moved axially in a direction substantially parallel with said central axis and out of seated engagement with said recesses during transition from said device engaged state to said device released state.

11. The over-torque protector device of claim 10, wherein each said receptacle has a receptacle axis substantially parallel with said central axis, each said receptacle having an axial surface in which a said recess is defined, each said recess having a side wall surface that diverges from its respective said receptacle axis as said recess side wall surface approaches said receptacle axial surface.

12. The over-torque protector device of claim 11, wherein each said recess is symmetrical about its respective receptacle axis.

13. The over-torque protector device of claim 12, wherein each said recess is one of frustoconical and generally hemispherical.

14. The over-torque protector device of claim 1, wherein said drive hub plate has a face, said drive pulley face and said drive hub plate face spaced in a direction parallel with said central axis, said plurality of links located in a direction parallel with said central axis between said drive hub plate face and said drive pulley face.

15. The over-torque protector device of claim 14, wherein said plurality of links is located between said drive hub plate face and said plurality of receptacles in said device engaged state.

16. The over-torque protector device of claim 15, wherein each of said plurality of links is under a prescribed, operational bending moment in said device engaged state by which said coupling means and said receptacles are held in engagement for unified rotation about said central axis in said device engaged state, said prescribed, operational bending moment exceeded during transition from said device engaged state to said device released state.

17. The over-torque protector device of claim 1, said links being impacted by said receptacles in said device released state, said links urged by said impacting receptacles into fully retracted positions relative to said drive hub plate in which further contact between said links and said receptacles does not occur.

18. The over-torque protector device of claim 17, wherein said links are retained in said fully retracted positions through frictional engagement between said links and said drive hub plate.

19. The over-torque protector device of claim 18, wherein each said link has a surface and said drive hub plate has a face, said link surface and said drive hub plate face in frictional engagement in said link fully retracted position.

20. The over-torque protector device of claim 18, wherein each said link has a surface from which extends a retention projection, and said drive hub plate has a face, said retention projection and said drive hub plate face in frictional engagement in said link fully retracted position.

* * * * *